(12) United States Patent
Kumawat et al.

(10) Patent No.: US 10,984,173 B2
(45) Date of Patent: Apr. 20, 2021

(54) VECTOR-BASED GLYPH STYLE TRANSFER

(71) Applicant: Adobe Inc., San Jose, CA (US)

(72) Inventors: Nirmal Kumawat, Rajsamand (IN); Praveen Kumar Dhanuka, Howrah (IN); Nipun Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/286,085

(22) Filed: Feb. 26, 2019

(65) Prior Publication Data

US 2020/0272689 A1 Aug. 27, 2020

(51) Int. Cl.
*G06F 40/109* (2020.01)
*G06K 9/62* (2006.01)
*G06K 9/68* (2006.01)

(52) U.S. Cl.
CPC ......... *G06F 40/109* (2020.01); *G06K 9/6232* (2013.01); *G06K 9/6828* (2013.01)

(58) Field of Classification Search
CPC ... G06F 40/109; G06K 9/6232; G06K 9/6828
See application file for complete search history.

(56) References Cited

U.S. PATENT DOCUMENTS

| 9,146,907 | B1* | 9/2015 | Joshi | G06K 15/1842 |
| 9,323,726 | B1* | 4/2016 | Joshi | G06K 9/342 |
| 9,349,202 | B1* | 5/2016 | Manohar | G06T 11/60 |
| 9,477,836 | B1* | 10/2016 | Ramam | H04L 63/0281 |
| 2004/0189666 | A1* | 9/2004 | Frisken | G06T 11/001 |
| | | | | 345/611 |
| 2006/0238539 | A1* | 10/2006 | Opstad | G06F 40/109 |
| | | | | 345/469 |
| 2007/0188497 | A1* | 8/2007 | Dowling | G06T 11/203 |
| | | | | 345/469 |
| 2008/0068383 | A1* | 3/2008 | Dowling | G06T 11/206 |
| | | | | 345/441 |
| 2010/0053171 | A1* | 3/2010 | Cheng | G06T 11/203 |
| | | | | 345/469 |
| 2010/0174985 | A1* | 7/2010 | Levy | G06F 40/106 |
| | | | | 715/244 |

(Continued)

FOREIGN PATENT DOCUMENTS

KR 20070037769 A * 4/2007

OTHER PUBLICATIONS

Yang, S., Liu, J., Lian, Z., & Guo, Z. (2017). Awesome typography: Statistics-based text effects transfer. In Proceedings of the IEEE Conference on Computer Vision and Pattern Recognition (pp. 7464-7473).*

(Continued)

*Primary Examiner* — Sarah Lhymn
(74) *Attorney, Agent, or Firm* — FIG. 1 Patents

(57) ABSTRACT

In implementations of vector-based glyph style transfer, a style transfer system transfers a modification of a modified glyph to an additional glyph. The system identifies the modification by comparing the modified glyph to a corresponding unmodified glyph. In one or more implementations, this includes identifying similar segments of the additional glyph based on a style transfer policy, which defines conditions for transferring the modification to the additional glyph. The system transfers the modification to the additional glyph by mapping the modification to the similar segments.

20 Claims, 9 Drawing Sheets

(56) References Cited

U.S. PATENT DOCUMENTS

| | | | | |
|---|---|---|---|---|
| 2011/0158464 | A1* | 6/2011 | Rane | G06K 9/00416 |
| | | | | 382/100 |
| 2013/0304604 | A1* | 11/2013 | Hoffman | G06Q 30/0621 |
| | | | | 705/26.5 |
| 2014/0035926 | A1* | 2/2014 | Burago | G06T 11/203 |
| | | | | 345/441 |
| 2014/0285495 | A1* | 9/2014 | Kang | G06T 11/60 |
| | | | | 345/471 |
| 2015/0348297 | A1* | 12/2015 | Kaasila | G06F 16/51 |
| | | | | 345/467 |
| 2017/0053424 | A1* | 2/2017 | Wang | G06F 40/109 |

OTHER PUBLICATIONS

Ropinski, T., Oeltze, S., & Preim, B. (2011). Survey of glyph-based visualization techniques for spatial multivariate medical data. Computers & Graphics, 35(2), 392-401.*

Ropinski, T., & Preim, B. (Feb. 2008). Taxonomy and usage guidelines for glyph-based medical visualization. In SimVis (pp. 121-138).*

Upchurch, P., Snavely, N., & Bala, K. (2016). From A to Z: supervised transfer of style and content using deep neural network generators. arXiv preprint arXiv:1603.02003.*

Azadi,"Multi-Content GAN for Few-Shot Font Style Transfer", Dec. 1, 2017, 16 pages.

* cited by examiner

300 

302
Identify a modification and a replaced segment of an unmodified vector-based glyph by comparing a modified vector-based glyph to the unmodified vector-based glyph

304
Identify a similar segment of an additional vector-based glyph, the similar segment and the replaced segment having at least one feature in common

306
Transfer the modification to the additional vector-based glyph by mapping the modification to the similar segment

*Fig. 3*

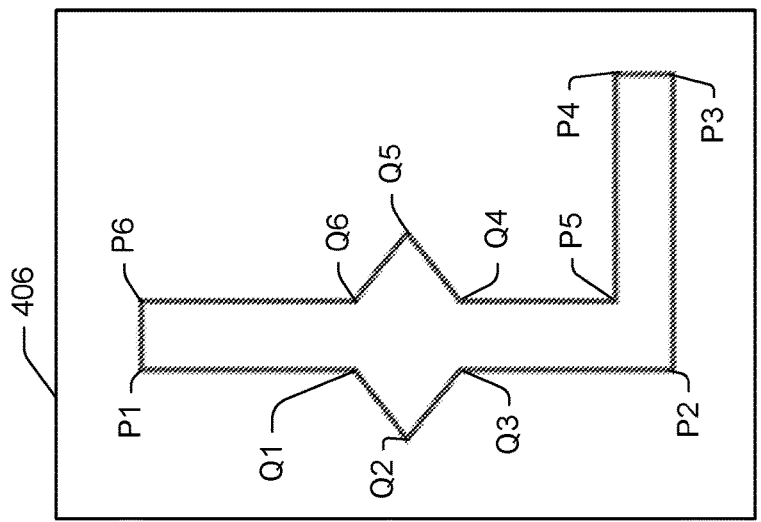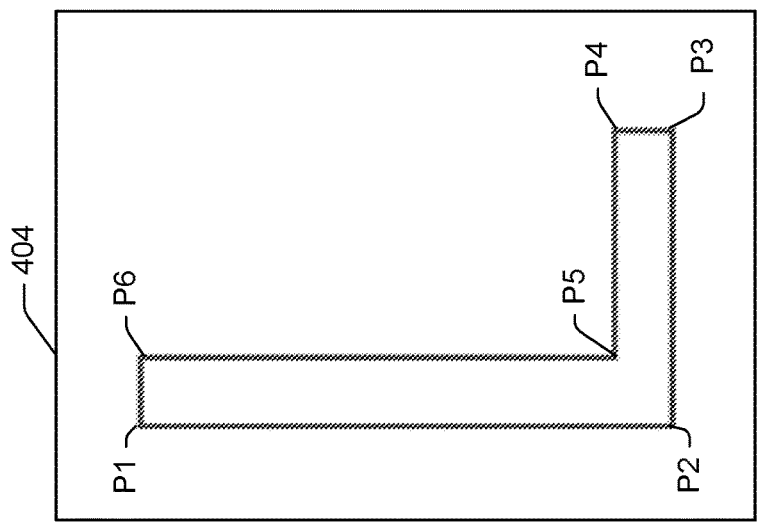

600

602
Identify a color gradient by comparing a modified vector-based glyph to an unmodified vector-based glyph

604
Compute input stops of using a tight bounding box of the modified vector-based glyph to transfer the color gradient to an additional vector-based glyph

606
Transfer the color gradient to the additional vector-based glyph by mapping the computed input stops on a bounding box of the additional vector-based glyph

*Fig. 6*

VECTOR-BASED GLYPH STYLE TRANSFER

BACKGROUND

Text is one of the most important tools available to digital artists and marketers because it can simultaneously convey a message and propagate a theme or a brand. For example, digital artists commonly dedicate a significant amount of effort to designing glyphs that are visually similar in a way that accentuates the theme or the brand in text represented by the glyphs. Typically, this effort involves the artist manually modifying several existing glyphs to have a common style and then using the modified glyphs to stylize text. The style could be a shape or geometry, a color or color pattern, a texture or shading, or any combination of these examples. In this manner, the substance of the text may convey a message and the style of the text can propagate the theme or brand.

Conventional systems for glyph style transfer use neural networks such as a generative adversarial network to propagate a style from an image of one glyph to images of other glyphs. In particular, the generative adversarial network is implemented by a computing device that receives and exposes the network to several training images of glyphs having a style. The network outputs images of additional glyphs based on features learned from the training images. These additional glyphs are generated by a generator of the generative adversarial network to have the style of the glyphs depicted in the training images.

These conventional systems for glyph style transfer require multiple training examples of glyphs having a modification to generate output images of additional glyphs having the modification. In addition to requiring multiple training examples, conventional systems that use neural networks require training images having a raster format because of the spatial relationship of pixels in raster images. Thus, conventional systems cannot use vector graphics to transfer glyph style. Since fonts typically need to be generated at high resolution for most practical applications, these conventional techniques have limited value in many scenarios.

Furthermore, generative adversarial network systems are a computationally expensive means of glyph style transfer and, as a result, the time required generate output images of glyphs having a transferred style is substantial. The substantial time delay associated with conventional systems is frustrating to digital artists. For example, a digital artist may have to wait to have access to the system, and then wait as the system is trained for the artist's needs, and then wait minutes for the trained system to generate the output images for the artist.

Consider an example in which a portion of text represented by glyphs is modified to have two specific features per glyph. In this example, the glyphs could be generated by a generative adversarial network trained using several images of glyphs having the two specific features. If it was desirable to represent the portion of text by glyphs modified to have only one of the two specific features, however, then additional training samples would be required and the network would need to process the additional training samples. Thus, not only are conventional systems inflexible but they are also inefficient and computationally expensive, such as when new training images must be used to train the generative adversarial network for different styles.

SUMMARY

Systems and techniques are described for vector-based glyph style transfer. A computing device implements a style transfer system which receives an outline of a modified vector-based glyph and an outline of an unmodified vector-based glyph as inputs. The style transfer system converts the outlines into segments and identifies added or modified segments of the modified glyph by comparing the modified glyph segments to the unmodified glyph segments on a segment-by-segment basis. Based on this comparison, the system identifies a list of segments to be replaced of the unmodified glyph and a list of replacement segments which are the added or modified segments of the modified glyph. In this way, the list of replacement segments can describe a feature of a glyph's style and the list of segments to be replaced can be used to transfer the feature to an additional vector-based glyph.

The style transfer system also converts an outline of the additional glyph into segments and compares each of these segments to the list of segments to be replaced. By comparing the segments to be replaced to the additional glyph segments, the system can identify similar segments of the additional glyph. Broadly speaking, the similar segment is identified based on having some feature in common with the segments to be replaced of the unmodified glyph. The system transfers the modification to the additional glyph by mapping the replacement segments to the similar segment. In this way, the style transfer system applies the style feature of the modified glyph to the additional glyph based on the feature that is common between the similar segment and the segments to be replaced.

The described systems improve digital glyph style transfer by only requiring a single input glyph with a modification to transfer the modification to additional glyphs. Furthermore, the system is capable of receiving vector-based inputs and outputting vector-based outputs, thus facilitating vector-based style transfer which is not possible using conventional techniques. Additionally, these systems are computationally efficient because they do not require hours of computations to transfer a modification to an additional glyph as is the case with conventional neural network based systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a modification of a modified vector-based glyph is transferred to another vector-based glyph.

FIGS. 4A and 4B are illustrations depicting an example representation of direction-based modification transfer.

FIG. 6 is a flow diagram depicting a procedure in an example implementation in which a color gradient modification of a modified vector-based glyph is transferred to another vector-based glyph.

DETAILED DESCRIPTION

Overview

Figure 1:
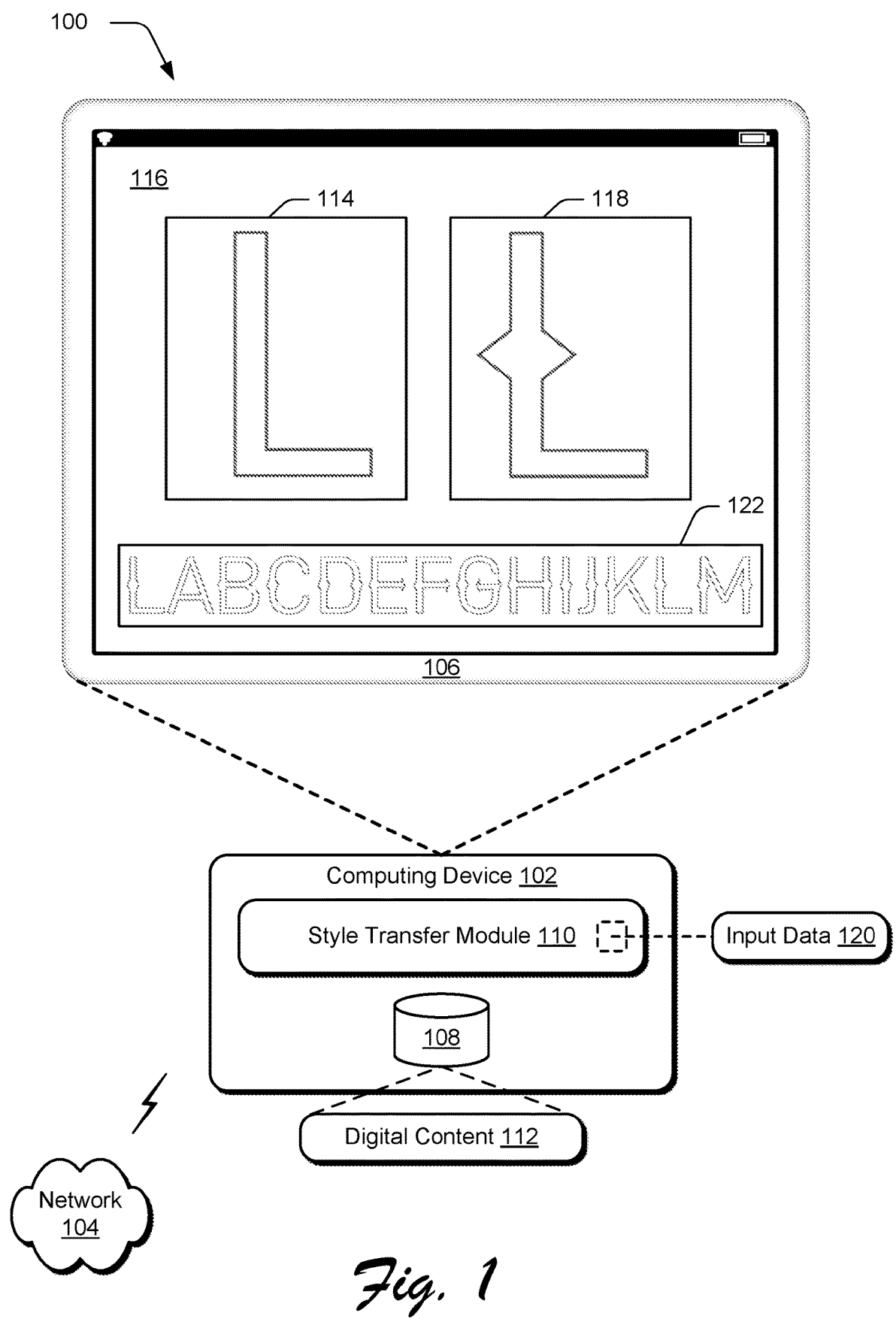
FIG. 1 is an illustration of an environment in an example implementation that is operable to employ digital systems and techniques as described herein.

Text is an important tool for digital artists and marketers because text can simultaneously convey a message and propagate a theme. Digital artists commonly dedicate a significant amount of effort to designing glyphs that are aesthetically similar in a way that represents the theme or style. Typically, this effort involves the artist manually modifying several existing glyphs to have a common style and then using the modified glyphs to stylize text. The style could be a shape or geometry, a color or color pattern, a texture or shading, or any combination of these examples, and the style is frequently a modification to an existing glyph. Thus, the substance of the text may convey a message and the style of the text can propagate the theme.

Conventional techniques for glyph style transfer use neural networks such as a generative adversarial network to generate images of glyphs having a style. In particular, the generative adversarial network is trained by a computing device that receives and exposes the network to several images of glyphs having a style. Based on this training, the network learns to output images of additional glyphs having the style. Specifically, these additional glyphs are generated by a generator of the generative adversarial network to have the style of the glyphs depicted in the training images.

Conventional systems for glyph style transfer require multiple example images of glyphs having a modification in order to generate images of additional glyphs having the modification. In addition to requiring multiple training examples, conventional systems are only able to use images, e.g., raster images, for generation of output images. Use of vectors is not possible with conventional techniques. Thus, not only are conventional systems inflexible but they are also inefficient and computationally expensive, such as when new training images must be used to train the generative adversarial network for different styles.

To overcome these problems, vector-based glyph style transfer is leveraged in a digital medium environment. In accordance with the described techniques, a computing device implements a style transfer system which receives an outline of an unmodified vector-based glyph and an outline of a modified vector-based glyph as inputs. The style transfer system includes a representation module which is implemented to convert the outlines into segments. The style transfer system also includes a modification identification module which is implemented to identify added or modified segments of the modified glyph by comparing the modified glyph segments to the unmodified glyph segments on a segment-by-segment basis. Based on this comparison, the modification identification module identifies a list of segments to be replaced of the unmodified glyph and a list of replacement segments which are the added or modified segments of the modified glyph. In this way, the list of replacement segments can describe a feature of a glyph's style and the list of segments to be replaced can be used to transfer the feature to an additional vector-based glyph.

The representation module is also implemented to convert an outline of the additional vector-based glyph into segments, and a segment identification module can be implemented to compare these segments to the list of segments to be replaced. By comparing the segments to be replaced to the additional glyph segments, the system can identify similar segments of the additional glyph. Broadly, the similar segment is identified based on having a feature in common with the segments to be replaced of the unmodified glyph. A transferring module is implemented to transfer the modification to the additional glyph by mapping the replacement segments to the similar segment. In this way, the style transfer system applies the style feature of the modified glyph to the additional glyph based on the feature that is common between the similar segment and the segments to be replaced.

The style transfer system also includes a transfer policy module that is implemented to apply a style transfer policy which defines rules for transferring the modification of the modified glyph to the additional glyphs. Specifically, the rules for transferring the modification can specify requirements for the feature that is common between the similar segment and the segments to be replaced. Examples of style transfer policies may include segment-based mapping and region-based mapping. A segment-based mapping policy may specify that modifications of line segments of the modified glyph should be mapped to line segments of the additional glyphs having a similar direction and that modifications of curve segments of the modified glyph should be mapped to curve segments of the additional glyphs having a similar direction. A region-based mapping policy can specify that modifications of the modified glyph should be mapped spatially to the additional glyphs meaning that a modification in a region of the modified glyph is mapped to a portion of an additional glyph in the same region. In this way, line segments may be mapped to curve segments and curve segments may be mapped to line segments.

For example, the style transfer policy may specify that the feature in common is any feature or group of features of the segments to be replaced. Consider an example in which the style transfer policy specifies that the feature in common is a type of segment. In this example, the type of segment could be a line segment or it could be a curve segment. If the segments to be replaced are curve segments, then the segment identification module would compare the segments to be replaced to the additional glyph segments based on the feature in common being a curved segment. If a curved segment is identified among the additional glyph segments, then the transferring module would replace the curved segment of the additional glyph with the list of replacement segments of the modified glyph. Alternatively, if a curved segment is not identified from the additional glyph segments, then no replacements would be made to the additional glyph segments. By adjusting rules of the style transfer policy, glyph style transfer can be achieved automatically and in many variations using a single input modification.

The described systems improve digital glyph style transfer by only requiring a single input glyph with a modification to transfer the modification to additional glyphs. Furthermore, the system is capable of receiving vector-based inputs and outputting vector-based outputs, thus facilitating vector-based style transfer which is not possible using conventional techniques. Additionally, these systems are computationally efficient and do not require hours of computations to transfer a modification to an additional glyph as is the case with conventional neural network based systems.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a style transfer module 110. The storage device 108 is illustrated to include digital content 112.

An example of the digital content 112 is a vector-based font which includes a plurality of glyphs such as an unmodified glyph 114 which is displayed in a user interface 116 on the display device 106. A modified glyph 118 is also displayed in the user interface 116, and the modified glyph 118 may be included in input data 120. The style transfer module 110 is illustrated as having, receiving, and/or transmitting input data 120. For example, the computing device 102 may implement the style transfer module 110 to receive the input data 120 which can include the unmodified glyph 114 and the modified glyph 118, and the style transfer module 110 can process the input data 120 to transfer a modification of the modified glyph 118 to additional glyphs 122.

Figure 2:
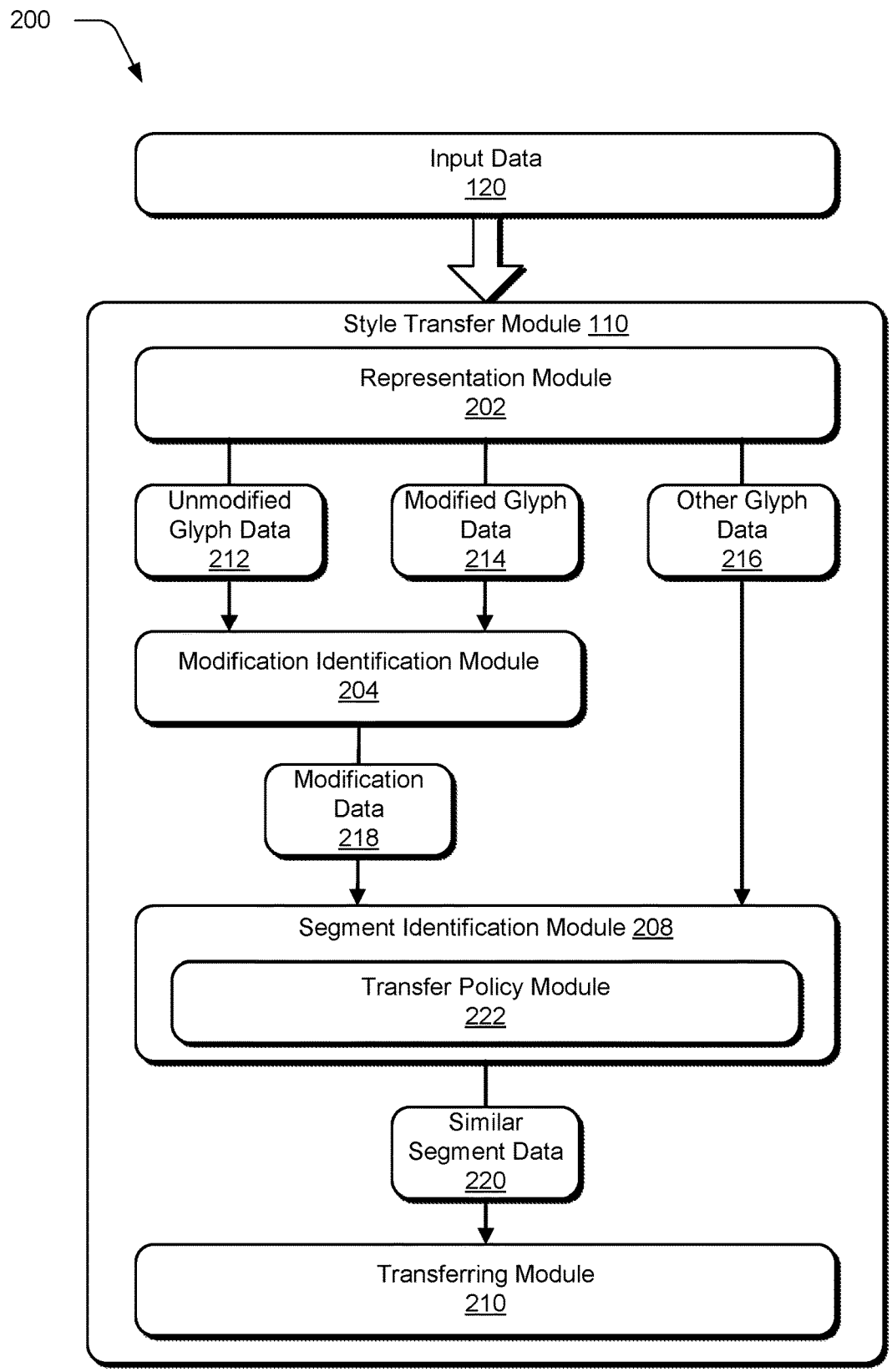
FIG. 2 depicts a system in an example implementation showing operation of a style transfer module.

FIG. 2 depicts a system 200 in an example implementation showing operation of a style transfer module 110. The style transfer module 110 is illustrated to include a representation module 202, a modification identification module 204, a segment identification module 208, and a transferring module 210. The computing device 102 implements the style transfer module 110 to receive input data 120, e.g., the style transfer module 110 may receive the input data 120 over the network 104 or based on user inputs received by the computing device 102 via the user interface 116. In one or more implementations, the representation module 202 may receive the input data 120 and the representation module 202 may process the input data 120 as unmodified glyph data 212, modified glyph data 214, and other glyph data 216. For example, the style transfer module 110 may receive an outline of the unmodified glyph 114 as part of receiving the input data 120, and the representation module 202 is implemented to convert the outline of the unmodified glyph into segments which are represented by the unmodified glyph data 212.

In one example, the unmodified glyph data 212 describes the outline of the unmodified glyph 114 as closed Bezier paths. In this way, each of the unmodified glyph segments is defined by a start point and an endpoint and these two points also define a direction of each segment as being from the start point to the endpoint. The unmodified glyph data 212 can also describe other features of the unmodified glyph segments such as a segment type as being either a line or a curve.

The input data 120 may also include an outline of the modified glyph 118 which the representation module 202 may receive to convert the outline of the modified glyph 118 into segments which are represented by the modified glyph data 214. For example, the modified glyph data 214 may describe the modified glyph as closed Bezier paths such that each of the modified glyph segments has a start point, an endpoint, and a direction based on the start point and the endpoint.

Broadly, the modification identification module 204 can identify similarities and differences between the unmodified glyph 114 and the modified glyph 118 such that the identified differences between the modified glyph 118 and the unmodified glyph 114 are identified as the modification of the modified glyph 118. The modification identification module 204 also identifies replaced segments of the unmodified glyph 114 as segments to be replaced. In one or more implementations, the modification identification module 204 may receive the unmodified glyph data 212 describing the unmodified glyph segments and the modified glyph data 214 describing the modified glyph segments. For example, the modification identification module 204 is implemented to identify added or modified segments of the modified glyph 118 by comparing the modified glyph segments to the unmodified glyph segments on a segment-by-segment basis. Based on this comparison, the modification identification module 204 identifies a list of segments to be replaced of the unmodified glyph 114 and a list of replacement segments which are the added or modified segments of the modified glyph 118.

In one or more implementations, the input data 120 may include an outline of an additional glyph. For example, the style transfer module 110 may receive the outline of the additional glyph as part of receiving the input data 120, and the representation module 202 can be implemented to convert the outline of the additional glyph into segments which are represented by the other glyph data 216. In this manner, the other glyph data 216 describes the outline of the additional glyph as closed Bezier paths, and each of the additional glyph segments is defined by a start point and an endpoint and these points also define a direction of each additional glyph segment as being from the start point to the endpoint. The other glyph data 216 may also describe other features of the additional glyph segments such as a segment type as being either a line segment or a curve segment. Since the other glyph data 216 describes the additional glyph as segments, the style transfer module 110 can compare the additional glyph segments to the list of segments to be replaced of the unmodified glyph 114 to identify similar segments of the additional glyph. In particular, the similar segment or similar segments are identified based on having a feature in common with the segments to be replaced. By processing the unmodified glyph data 212, the modified glyph data 214, the modification data 218, and the other glyph data 216, the segment identification module 208 is configured to determine whether the additional glyph or other glyphs include e similar segments to the segments to be replaced of the unmodified glyph 114.

If the segment identification module 208 identifies a similar segment, then the identification module processes similar segment data 220 such that the similar segment data 220 describes the identified similar segment. In an example, the segment identification 208 module may identify multiple similar segments of the additional glyph, and the similar segment data 220 therefore describes each of the multiple similar segments identified. In one or more implementations, the segment identification module 208 may identify multiple similar segments of the additional glyph based on the modification identification module 204 having identified multiple replaced segments of the unmodified glyph 114. Additionally, the segment identification module 208 may identify multiple similar segments of the additional glyph based on the modification identification module 204 having identified a single replaced segment of the unmodified glyph 114.

The transferring module 210 is illustrated as receiving the similar segment data 220 that describes similar segments of the additional glyph identified by the segment identification module 208 as having a feature in common with the segments to be replaced of the unmodified glyph 114. The transferring module 210 is implemented to transfer the additional or modified segments of the modified glyph 118 to each of the similar segments of the additional glyph described by the similar segment data 220. Again, the additional or modified segments represent a modification of the modified glyph 118 as compared to the unmodified glyph 114 and this modification is a stylistic modification. By transferring or mapping the additional or modified segments to the additional or other glyph, the transferring module 210 is configured to transfer a style of the modified glyph 118 to the additional glyph, and the transferring module 210 maps the additional or modified segments to the similar segments of the additional glyph based on the similar segments having a feature in common with the segments to be replaced of the unmodified glyph 114. In this way, the transferring module 210 applies the style feature of the modified glyph 118 to the additional glyph automatically and without user intervention. For example, the transferring module 210 may be configured to map the modification to the similar segments by scaling the modification to match the similar segments. In another example, the transferring module 210 may be configured to map the modification to the similar segments by shifting the modification to match the similar segments.

Style Transfer Policy

The segment identification module 208 is also illustrated as including a transfer policy module 222, which represents functionality to apply a style transfer policy that defines rules for transferring the identified additional or modified segments of the modified glyph 118 to the additional glyphs 122. Generally, the style transfer policy adds both functionality and flexibility to the style transfer module 110 that facilitates user-defined style transfer between vector-based glyphs. In one example, the style transfer policy can define conditions for transferring the identified modification of the modified glyph 118 to the additional glyph or other glyphs. For example, the modification data 218 and the other glyph data 216 can describe the unmodified glyph 114, the modified glyph 118, and the additional glyphs or glyphs as segments having directions.

In one or more implementations, the style transfer policy may indicate, for example, that a modification of a segment is transferred to another segment only if the line segments have the same direction. In a two-dimensional example, a segment direction may be determined with reference to the segment's start point and endpoint in a Cartesian plane such that differences between x-coordinates and y-coordinates of the start point and endpoint define the segment's direction. By way of example, if a value of an x-coordinate of a segment's start point is less than a value of an x-coordinate of the segment's endpoint, then the segment's direction is towards the right and if the value of the x-coordinate of the segment's start point is greater than the value of the x-coordinate of the endpoint, then the segment's direction is towards the left. Further, if a value of a y-coordinate of the segment's start point is less than a value of the y-coordinate of the segment's endpoint, then the segment's direction is up, and if the value of the y-coordinate of the start point is greater than the value of the y-coordinate of the endpoint, then the segment's direction is down.

Consider an example in which the style transfer policy adds functionality and flexibility to the style transfer module 110 using direction-based rules for transferring style between vector-based glyphs. Assume, for example, that an outline of the unmodified glyph 114 is converted into a single segment for illustration purposes that has a down direction. Further assume that an outline of the modified glyph 118 is also converted into segments which include a modification or a change relative to the unmodified glyph 114 such as additional or modified segments. Now assume that an outline of an additional glyph is converted to segments and that the segments of the additional glyph resemble a square shape. In this example, some of the additional glyph segments can be defined as follows: segment 1 begins at the upper left corner of the square shape and ends at the lower left corner of the square; and segment 2 begins where segment 1 ends (at the lower left corner of the square) and segment 2 ends at the lower right corner of the square, meaning that segment 1 has a direction down and segment 2 has a direction right. If the style transfer policy specifies that similar segments are identified based on having a direction in common with the segments to be replaced of the unmodified glyph of this example, then only segment 1 would be identified as a similar segment by the segment identification module 208 because segment 1 has the same direction as the segment to be replaced, i.e., down. Segment 2 would not be identified as a similar segment in this example because Segment 2 has a different direction than the segment to be replaced. Accordingly, the transferring module maps the additional or modified segments of the modified glyph to segment 1 and not to segment 2 in this example. Now consider the same example but the style transfer policy is changed, e.g., in response to user inputs, such that the policy specifies that similar segments are identified based on having a different direction than the segments to be replaced. In this second example, only segment 2 would be identified as a similar segment because it has a different direction than the segment to be replaced, i.e., right versus down. In this manner, the style transfer policy adds both functionality and flexibility such that style features can be transferred among vector-based glyphs in accordance with user selectable or user definable rules.

By way of these and other examples, the style transfer policy can be used to provide augmented or additional functionality of vector-based glyph style transfer. For example, the transfer policy module 222 may apply the style transfer policy to indicate that additional or modified segments of the modified glyph 118 are only transferred to vertical segments of the other glyph or other glyphs. In this example, the segments to be replaced may or may not be vertical segments. Moreover, the transfer policy module 222 may apply the style transfer policy such that a position of the modification of the modified glyph 118 is preserved in the transfer of the modification to the other glyphs or glyphs. If the modification is in a middle position of the modified glyph 118, for instance, then the transfer policy module 222 may only allow transfer of the modification to a middle position of the other glyph or glyphs, e.g., based on a determined style transfer policy.

In one or more implementations, the transfer policy module 222 may apply the style transfer policy to preserve a height and/or a width of a segment of the modified glyph 118 having the modification. In this manner, the transfer policy module 222 may apply the style transfer policy such that the modification is only transferred to segments of the other glyph or glyphs if the segments of the other glyphs or other glyphs have a same height and/or width as a segment of the modified glyph 118 having the modification. For example, the style transfer policy may specify that similar segments are identified based on the similar segments having a height and/or a width in common with the segments to be replaced of the unmodified glyph 114.

By way of example, the style transfer policy can reference coordinates, e.g., Cartesian coordinates, of glyph features to define rules for transferring the modification from the modified glyph 118 to the other glyphs or glyphs. In this example, the transfer policy module 222 may reference x-coordinates and y-coordinates of both the modified glyph 118 and additional glyph or other glyphs to apply aspects of the style transfer policy, or the transfer policy module 222 can reference x-coordinates and y-coordinates of the unmodified glyph 114 and the additional glyphs. For example, the style transfer policy may specify that the modification is transferred to all vertical stems of the additional glyph or glyphs if the vertical stems share a y-coordinate with a stem of the modified glyph 118 having the modification, or the style transfer policy may specify that similar segments are identified based on the similar segments sharing a y-coordinate with the segments to be replaced. In another example, the style transfer policy may reference a slope between coordinates of the other glyphs or glyphs such as to specify that the modification of the modified glyph 118 is transferred to all horizontal bars of the other glyphs or glyphs, or the style transfer policy may specify that similar segments are identified based on the similar segments sharing an x-coordinate with the segments to be replaced.

By way of example, the style transfer policy may specify that similar segments are identified based on the similar segments sharing a type of segment with the segment to be replaced. In one or more implementations, the style transfer policy may indicate that similar segments are identified as having two features in common with the segments to be replaced of the unmodified glyph 114. For example, the style transfer policy may specify that the modification is transferred to all curved segments of the additional glyph or glyphs if the curved segments share a y-coordinate with a stem of the modified glyph 118 having the modification.

In another example, the transfer policy module 222 can reference x-coordinates and y-coordinates of both the modified glyph 118 and the additional glyph or glyphs to transfer the modification by scaling the modification to match dimensions of a segment of the additional glyph or glyphs. In this manner, the style transfer policy can indicate that the modification of the modified glyph 118 is transferred to and scaled to match a segment of the additional glyph or glyphs. For example, the modification may be transferred to segments of the additional glyph or other glyphs without reference to y-coordinates of the modified glyph 118 and without reference to y-coordinates of the additional glyph or glyphs, and the transfer policy module 222 can scale the modification to match segments of the additional glyph or glyphs.

The segment identification module 208 is implemented to process the other glyph data 216 and the modification data 218 to identify similar segments based on the style transfer policy. For example, the segment identification module 208 may generate segment data 220 which memorializes or describes similar segments based on the style transfer policy. In this manner, the similar segment data 220 includes an indication of the identified similar segments to receive the transferred modification, based on the style transfer policy.

The transferring module 210 is illustrated as receiving the similar segment data 220. In accordance with the described techniques, the transferring module 210 represents functionality to process the similar segment data 220 to apply the identified modification to the additional glyph or other glyphs based on the style transfer policy. In this way, the style transfer module 110 uses the similar segment data 220 to transfer a modification of the modified glyph 118 to other glyphs 122.

In one or more implementations, the transferring module 210 may be configured to reference coordinates of segments of the unmodified glyph 114, the modified glyph 118, and the additional glyph to map the replacement segments of the modified glyph 118 to the additional glyph based on the segments to be replaced of the unmodified 114 glyph in accordance with the style transfer policy. In this way, the transferring module 210 can compute a delta or a difference between coordinates to provide scaling or shifting functionality when transferring the replacement segments to the additional glyph. For example, the transferring module 210 may preserve y-coordinates between the unmodified glyph 114 and/or the modified glyph 118 when transferring or mapping the replacement segments to the additional glyph. In this example, the delta computation is zero as the coordinates have been preserved in accordance with the style transfer policy. In one or more implementations, the transferring module 210 can compute the delta of the x-coordinates by taking a starting point of a segment from the list of segments to be replaced as a reference point to perform the delta computation.

By way of example, consider the other glyphs 122 illustrated in FIG. 1 which include a transferred modification from the modified glyph 118 in accordance with a particular style transfer policy. In the example shown in FIG. 1, for instance, the particular style transfer policy may indicate that a modification of a vertical segment of the modified glyph 118 is only transferred to vertical segments of the other glyph or glyphs. Also, the particular style transfer policy enforced in relation to the illustrated other glyphs 122 preserves a position of the modification of the modified glyph 118 in the transfer of the modification to the other glyphs or glyphs. Additionally, the particular style transfer policy in this example preserves both a height and a width of added segments in the transfer of the modification to the other glyph.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Vector-Based Glyph Style Transfer

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which a modification of a modified vector-based glyph is transferred to another vector-based glyph. A modification and a replaced segment of an unmodified vector-based glyph are identified by comparing a modified vector-based glyph to the unmodified vector-based glyph (block 302). For example, the modification identification module 204 compares the modified glyph 118 to the unmodified glyph 114 to identify the modification and the replaced segment. A similar segment of an additional vector-based glyph is identified, the similar segment and the replaced segment having at least one feature in common (block 304). In one example, the segment identification module 208 identifies the similar segment of the additional glyph or additional glyphs according to the style transfer policy. The modification is transferred to the additional vector-based glyph by mapping the modification to the similar segment (block 306). In another example, the transferring module 210 transfers the modification to one or more segments of the additional glyph or additional glyphs based on the similar segment data 220.

Figure 4B:
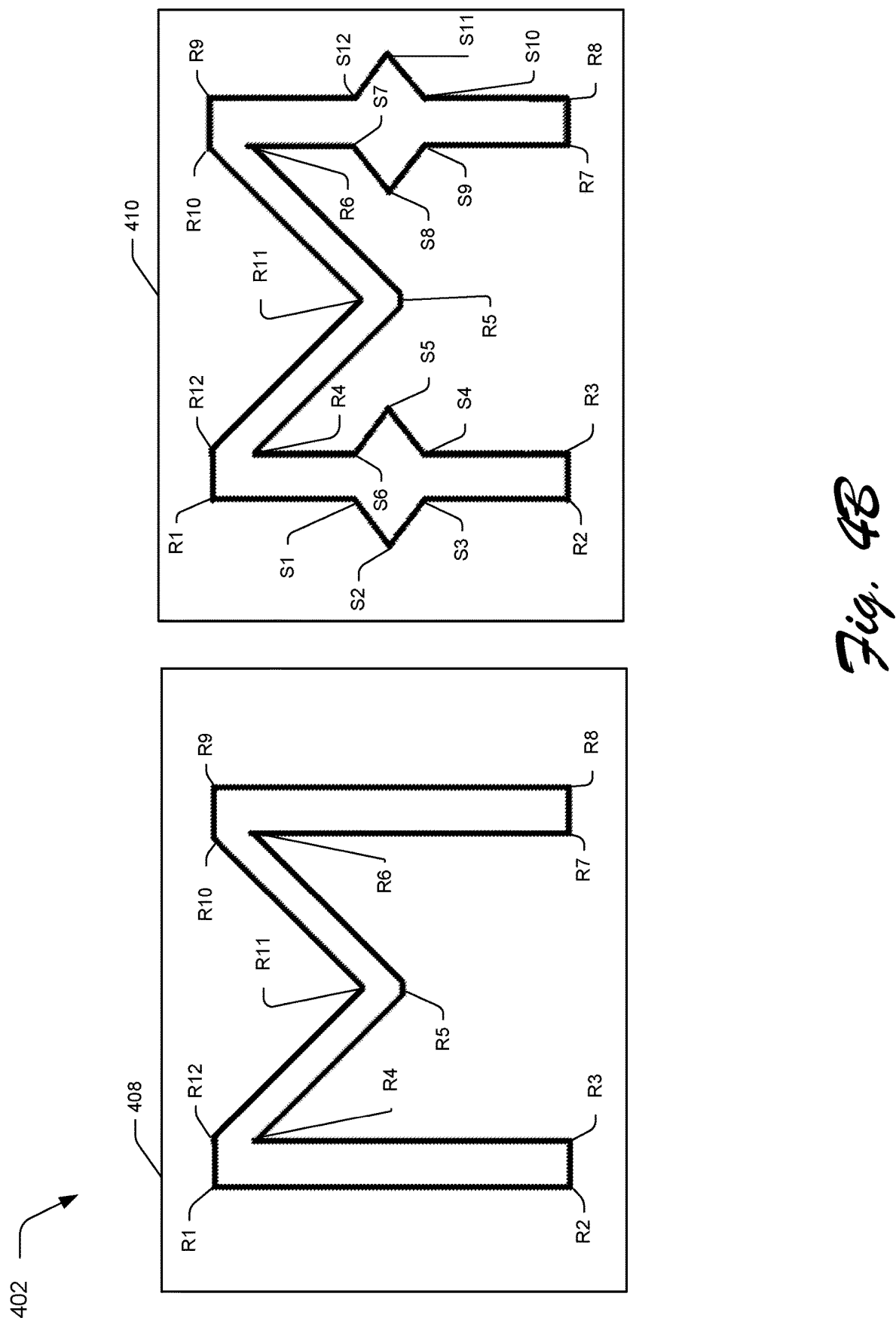

FIGS. 4A and 4B are illustrations depicting an example representation of direction-based modification transfer. FIG. 4A is an illustration 400 of an identification of a modification and FIG. 4B is an illustration 402 of a transfer of an identified modification. The illustration 400 includes an unmodified glyph 404 which is illustrated as a closed Bezier path of the unmodified glyph's outline denoted as points P1-P6. In one example, points P1-P6 may be expressed as:

$$P=[x,y]$$

where: P represents each point; x is an x-coordinate of the point; and y is a y-coordinate of the point. In another example, the unmodified glyph 404 can be represented by one or more segments as:

$$S=[p0,p1]$$

where: S represents each segment; p0 is a starting point of the segment; and p1 is an end point of the segment. Additionally, each segment may be a line segment or a curve segment so for each S if p0 and p1 are connected by a line, then S is a line segment; and if p0 and p1 are connected by a curve, then S is a curve segment. In one example, a direction of each segment may be expressed as:

Up: [$p0.y<p1.y$ and $p0.x==p1.x$]

Down: [$p0.y>p1.y$ and $p0.x==p1.x$]

Left: [$p0.x>p1.x$ and $p0.y==p1.y$]

Right: [$p0.x<p1.x$ and $p0.y==p1.y$]

LeftUp: [$p0.x>p1.x$ and $p0.y<p1.y$]

RightUp: [$p0.x<p1.x$ and $p0.y<p1.y$]

LeftDown: [$p0.x>p1.x$ and $p0.y>p1.y$]

RightDown: [$p0.x<p1.x$ and $p0.y>p1.y$]

where: p0.x is the x-coordinate of the start point of the segment; p0.y is the y-coordinate of the start point of the segment; p1.x is the x-coordinate of the end point of the segment; and p1.y is the y-coordinate of the end point of the segment.

In an example, the outline of the unmodified glyph 404 can be expressed as segments with directions as follows:

LineSegment[$P1,P2$]: Down

LineSegment[$P2,P3$]: Right

LineSegment[$P3,P4$]: Up

LineSegment[$P4,P5$]: Left

LineSegment[$P5,P6$]: Up

LineSegment[$P6,P1$]: Left

The illustration 400 also includes a modified glyph 406 which is illustrated as a closed Bezier path of the modified glyph's outline denoted as points P1, Q1, Q2, Q3, P2, P3, P4, P5, Q4, Q5, Q6, and P6. In another example, the outline of the modified glyph 406 may be expressed as segments with directions as follows:

LineSegment[$P1,Q1$]: Down

LineSegment[$Q1,Q2$]: LeftDown

LineSegment[$Q2,Q3$]: RightDown

LineSegment[$Q3,P2$]: Down

LineSegment[$P2,P3$]: Right

LineSegment[$P3,P4$]: Up

LineSegment[$P4,P5$]: Left

LineSegment[$P5,Q4$]: Up

LineSegment[$Q4,Q5$]: RightUp

LineSegment[$Q5,Q6$]: LeftUp

LineSegment[$Q6,P6$]: Up

LineSegment[$P6,P1$]: Left

In this way, the modified glyph 406 may be compared to the unmodified glyph 404 on a segment-by-segment basis. Based on this comparison, the modification identification module 204 identifies, for a given modification, one or more segments to be replaced of the unmodified glyph 404 and corresponding replacement segments of the modified glyph 406, such as by identifying the segments to replace and the replacement segments as follows:

Segments to Replace1:
{
LineSegment[P1, P2]: Down
}
Replacement Segments1:
{
LineSegment[P1, Q1]: Down
LineSegment[Q1, Q2]: LeftDown
LineSegment[Q2, Q3]: RightDown
LineSegment[Q3, P2]: Down
}
Segments to Replace2:
{
LineSegment[P5, P6]: Up
}
Replacement Segments2:
{
LineSegment[P5, Q4]: Up
LineSegment[Q4, Q5]: RightUp
LineSegment[Q5, Q6]: LeftUp
LineSegment[Q6, P6]: Up
}

The illustration 402 includes another glyph 408 which is illustrated as a closed Bezier path of the other glyph's 408 outline denoted as points R1-R12. In an example, the outline of the other glyph can be expressed as segments with directions as follows:

LineSegment[$R1,R2$]: Down

LineSegment[$R2,R3$]: Right

LineSegment[$R3,R4$]: Up

LineSegment[$R4,R5$]: RightDown

LineSegment[$R5,R6$]: RightUp

LineSegment[$R6,R7$]: Down

LineSegment[$R7,R8$]: Right

LineSegment[$R8,R9$]: Up

LineSegment[$R9,R10$]: Left

LineSegment[$R10,R11$]: LeftDown

LineSegment[$R11,R12$]: LeftUp

LineSegment[$R12,R1$]: Left

In accordance with the described techniques, the segment identification module 208 can analyze the other glyph 408 to identify its segments that are similar to replaced segments of the unmodified glyph 404. In one or more implementations, the style transfer policy may define one or more rules for identifying similar segments. In this example, a segment of the unmodified glyph that is to be replaced is LineSegment [P1, P2]: Down which is similar to LineSegment[R1, R2]: Down of the other glyph 408 because the two segments both have the same direction. The similar segment and the replacement segments can be described as:

Segments to Replace1:
{
LineSegment[R1, R2]: Down
}

Replacement Segments1:
{
LineSegment[R1, S1]: Down
LineSegment[S1, S2]: LeftDown
LineSegment[S2, S3]: RightDown
LineSegment[S3, R2]: Down
}

In an example, a segment to replace is LineSegment[P5, P6]: Up which is similar to LineSegment[R3,R4]: Up because the two segments both have the same direction. In another example, this similar segment and the replacement segments can be described as follows:

Segments to Replace2:
{
LineSegment[R3, R4]: Up
}

Replacement Segments2:
{
LineSegment[R3, S4]: Up
LineSegment[S4, S5]: RightUp
LineSegment[S5, S6]: LeftUp
LineSegment[S6, R4]: Up
}

In accordance with the described techniques, the transferring module 210 replaces the identified similar segments with the replacement segments to transfer the identified modification to the other glyph 408. In one example, the style transfer policy may define rules for transferring glyph modifications such that modifications are transferred to a first identified similar segment. In another example, the style transfer policy may define rules for transferring glyph modifications such that modifications are transferred to all identified similar segments. In this example, the segment to replace LineSegment[P1, P2]: Down is also similar to LineSegment[R6, R7]: Down because the two segments both have the same direction. In one example, the segment to replace and the additional similar segment can be described as:

Segments to Replace3:
{
LineSegment [R6, R7]: Down
}
Replacement Segments3:
{
LineSegment[R6, S7]: Down
LineSegment [S7, S8]: LeftDown
LineSegment [S8, S9]: RightDown
LineSegment [S9, R7]: Down
}

In another example, the segment to replace LineSegment [P5, P6]: Up is also similar to LineSegment[R8, R9]: Up because the two segments both have the same direction. Thus, the segment to replace and the additional similar segment can be described as:

Segments to Replace4:
{
LineSegment[R8, R9]: Up
}

-continued

```
Replacement Segments4:
{
    LineSegment[R8, S10]: Up
    LineSegment[S10, S11]: RightUp
    LineSegment[S11, S12]: LeftUp
    LineSegment[S12, R9]: Up
}
```

In one or more implementations, coordinates of the replacement segments can be adjusted to fit coordinates of the other glyph 408 by using a delta computation. For example, the transferring module 210 adjusts the coordinates of the replacement segments to fit coordinates of the other glyph by using a delta computation. In one example, the delta computation may be subject to the style transfer policy. In relation to the illustrated examples 400, 402, for instance, the y-coordinates for the modified glyph 406 may be the same as the y-coordinates of the other glyph 408, and the delta computation for the y-coordinates in this example is zero. In one or more implementations, the delta for the x-coordinates can be computed by taking a reference x-coordinate as the starting point of the only segment or the first segment from the replacement segments. The illustration 402 also includes a glyph with style transfer 410. This style transfer 410 may represent a result of such a delta computation and is illustrated as a closed Bezier path of the outline of the glyph with the style transfer denoted as points R1, S1, S2, S3, R2, R3, S4, S5, S6, R4, R5, R6, S7, S8, S9, R7, R8, S10, S11, S12, R9, R10, R11, and R12.

Figure 5:
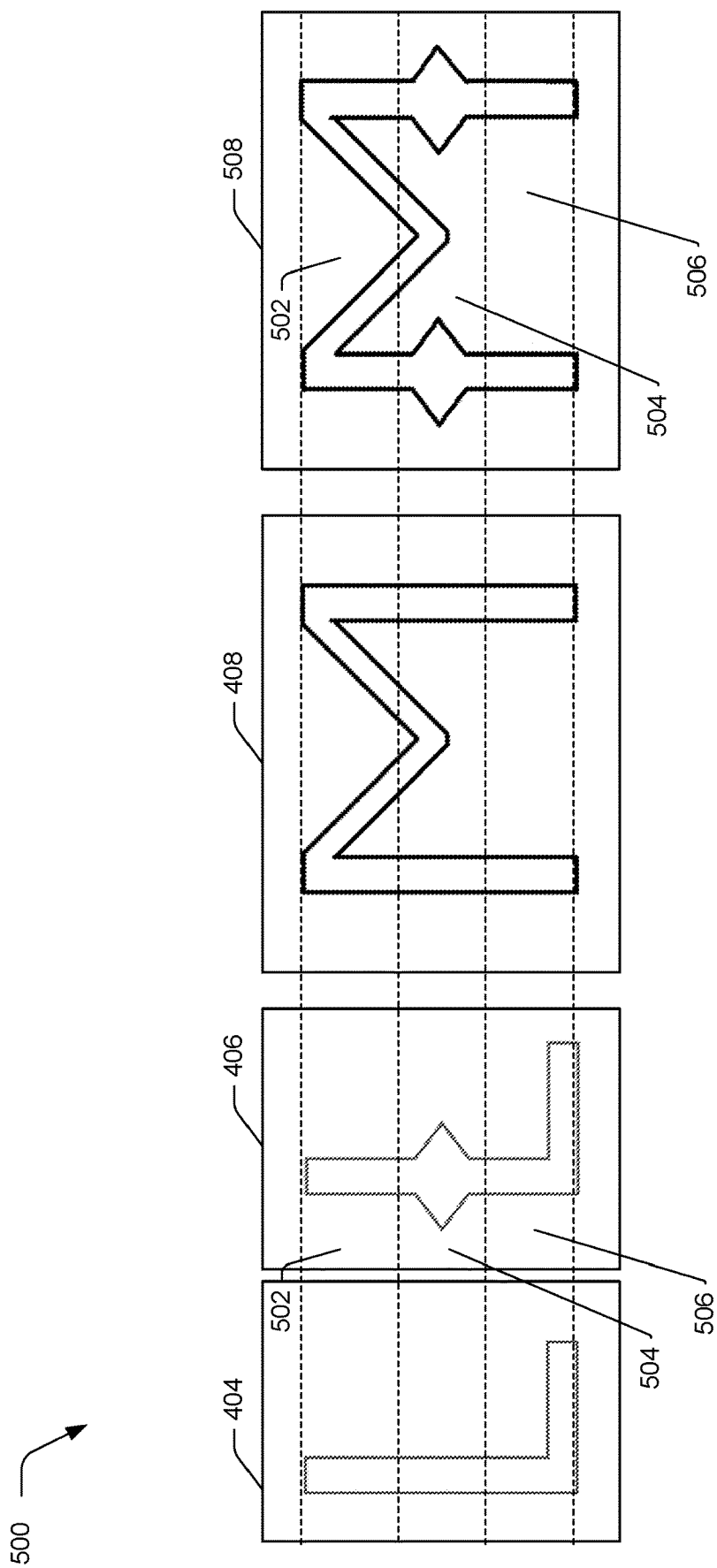
FIG. 5 is an illustration depicting an example representation of spatial-based modification transfer.

FIG. 5 is an illustration 500 depicting an example representation of spatial-based modification transfer. The illustration 500 includes the unmodified glyph 404, the modified glyph 406, and the other glyph 408. The modification of the modified glyph 406 can be identified by comparing the modified glyph 406 to the unmodified glyph 404 on a segment-by-segment basis. In one example, the modification is identified and the modified glyph 406 and the other glyph 408 are divided into regions illustrated as a first region 502, a second region 504, and a third region 506. The modification of the modified glyph 406 is in the second region 504 and the modification can be mapped to portions of the other glyph 408 also spatially in the second region 504. Thus, the illustration 500 includes a glyph with style transfer 508 which includes the modifications from the second region 504 of the modified glyph 406 incorporated into the segments of the other glyph 408 in the second region 504. In this example, portions of the other glyph 408 in the first region 502 and portions of the other glyph 408 in the third region 506 are not modified.

In an example, the transfer policy module 222 may be implemented to apply a style transfer policy that defines rules for transferring the identified modification to the other glyph 408. Thus, the style transfer policy may indicate that the modification of the modified glyph 406 is only mapped to portions of the other glyph 408 in the second region 504 if segments of the other glyph 408 in the second region 504 share a direction with segments of the unmodified glyph 404 in the second region 504. In another example, the style transfer policy may indicate that modifications of line segments of the modified glyph 406 are mapped to line segments and curve segments in the second region 504 of the other glyph 408 and that modifications of curve segments of the modified glyph 406 are mapped to line segments and curve segments in the second region 504 of the other glyph 408.

FIG. 6 is a flow diagram depicting a procedure 600 in an example implementation in which a color gradient modification of a modified vector-based glyph is transferred to an additional vector-based glyph. In one example, solid stroke color and fill color of a modified glyph 406 can be directly transferred to an additional glyph 408. In another example, a color gradient is identified by comparing a modified vector based glyph to an unmodified vector-based glyph (block 602). For example, the modification identification module 204 identifies the color gradient by comparing modified glyph data 214 to unmodified glyph data 212. Input stops or any other identification of relative orientation of the features of the color gradient can be used to map the color gradient to the additional glyph 408. Input stops are computed using a tight bounding box of the modified vector-based glyph to transfer the color gradient to an additional vector-based glyph (block 604). In one example, the style transfer module 110 may be implemented to compute the input stops. The color gradient is transferred to the additional vector-based glyph by mapping the computed input stops on a bounding box of the additional vector-based glyph (block 606). In another example, the style transfer module 110 can be implemented to transfer the color gradient to the additional vector-based glyph by mapping the computed input stops on the bounding box of the additional vector-based glyph.

Figure 7:
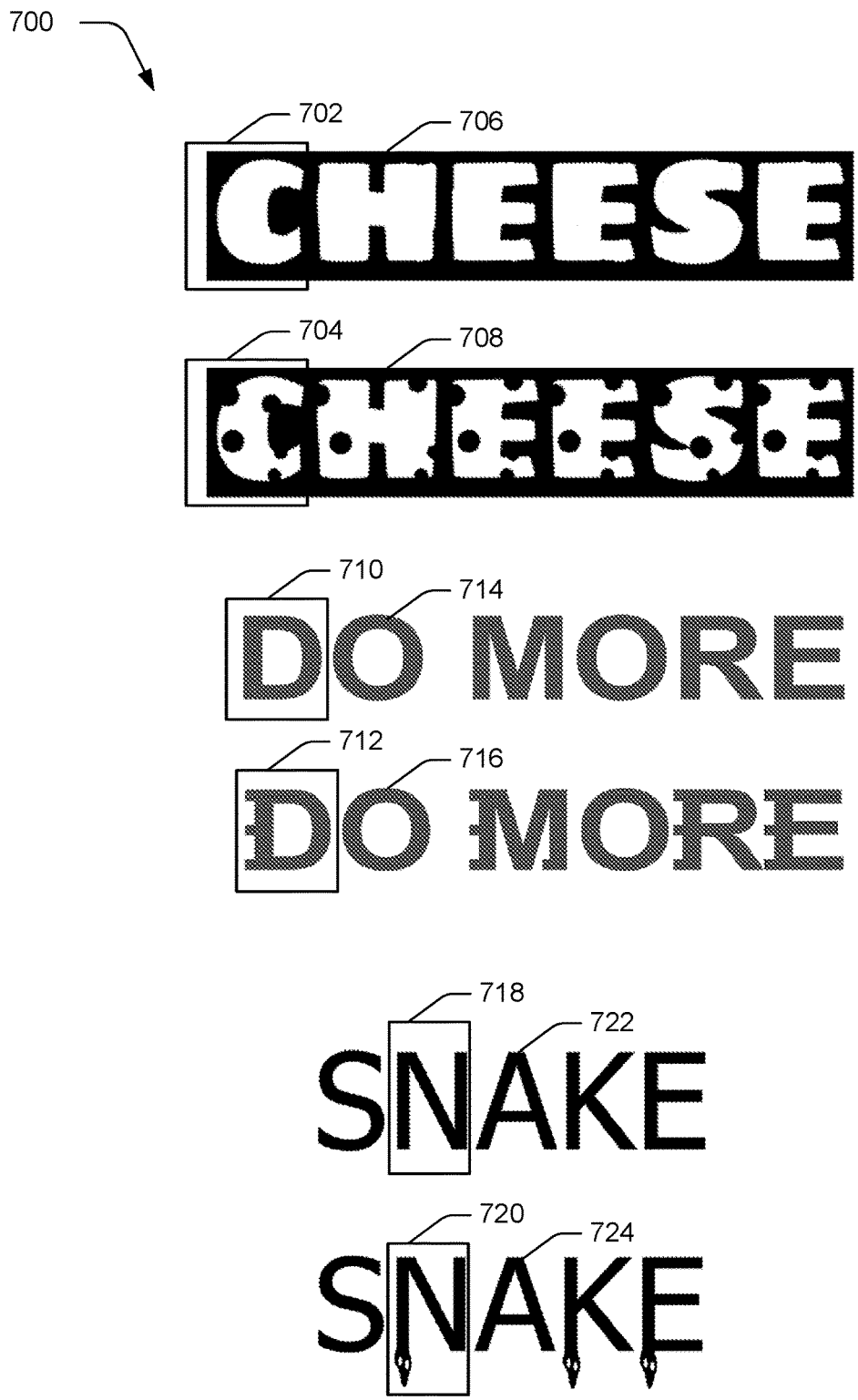
FIG. 7 is an illustration depicting three example representations of vector-based glyph style transfer.

FIG. 7 is an illustration 700 depicting three example representations of vector-based glyph style transfer. A first example includes an unmodified glyph 702 and a modified glyph 704. In this first example, other glyphs 706 are transferred a modification of the modified glyph 704 using spatial-based modification transfer which is illustrated by other glyphs with style transfer 708.

A second example includes an unmodified glyph 710 and a modified glyph 712. In this second example, other glyphs 714 are transferred a modification of the modified glyph 712 using direction-based modification transfer which is illustrated by other glyphs with style transfer 716.

A third example includes an unmodified glyph 718 and a modified glyph 720. In this third example, other glyphs 722 are transferred a modification of the modified glyph 720 using direction-based modification transfer which is illustrated by other glyphs with style transfer 722.

Although the examples are described in terms of modification of an outline of a glyph, the systems and techniques described herein are not limited to such modifications. For example, the described systems and techniques can transfer style modifications such as an addition of a closed segment inside of a portion of a glyph. In one example, the style transfer module 110 may be implemented to identify the modification as the added closed segment of a modified glyph, determine a spatial correlation in another glyph using spatial-based modification transfer, and transfer the added closed segment to another glyph based on the spatial correlation.

Additionally, although the examples are described in terms of glyph style transfer by transferring a modification from a single input glyph to additional glyphs, the described techniques are not limited to style transfer between glyphs of any particular font. In particular, these techniques are capable of applying glyph style transfer across font types. The techniques are not necessarily limited to transfer of style among vector-based glyphs such that the described techniques are equally able to transfer features of object to other objects.

Example System and Device

Figure 8:
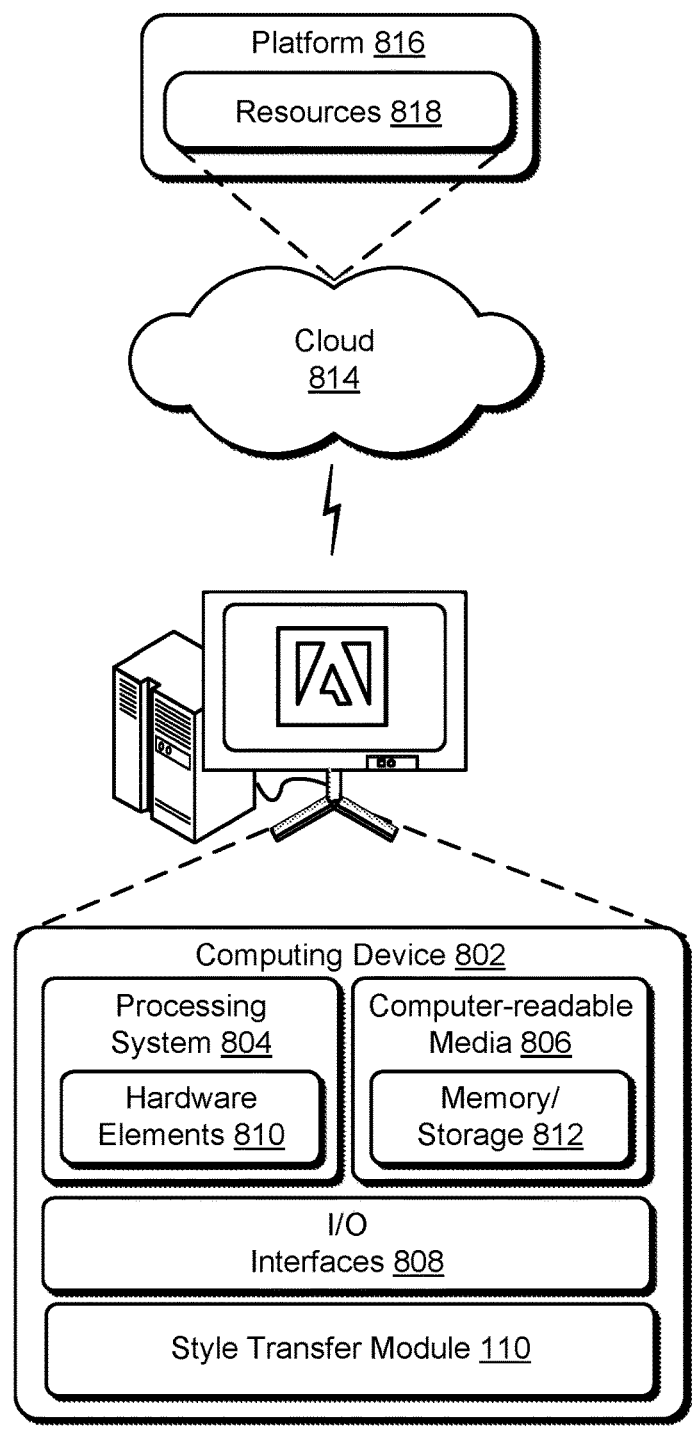
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the style transfer module 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the implementation of vector-based glyph style transfer has been described in language specific to structural features and/or methods, it is to be understood that the appended claims are not necessarily limited to the specific features or methods described. Rather, the specific features and methods are disclosed as example implementations of vector-based style transfer, and other equivalent features and methods are intended to be within the scope of the appended claims. Further, various different examples are described and it is to be appreciated that each described example can be implemented independently or in connection with one or more other described examples.

What is claimed is:

1. In a digital medium environment to identify a modification of a modified vector-based glyph and transfer the modification to an additional vector-based glyph, a method implemented by a computing device, the method comprising:

converting an outline of the modified vector-based glyph into segments and converting an outline of an unmodified vector-based glyph into unmodified segments;

comparing the segments and the unmodified segments on a segment-by-segment basis by:

determining a direction of each of the segments based on a difference between a start point and an endpoint of each of the segments;

determining a direction of each of the unmodified segments based on a difference between a start point and an endpoint of each of the unmodified segments; and comparing directions of the segments with directions of the unmodified segments;

identifying the modification as at least one of the segments and a replaced portion as at least one of the unmodified segments based on comparing the directions;

identifying at least one similar segment of the additional vector-based glyph by comparing the at least one of the unmodified segments to segments of an outline of the additional vector-based glyph, the at least one similar segment and the at least one of the unmodified segments having at least one feature in common; and transferring the modification to the additional vector-based glyph by mapping the at least one of the segments to the at least one similar segment.

2. The method as described in claim 1, wherein the at least one similar segment and the at least one of the unmodified segments have at least two features in common.

3. The method as described in claim 1, wherein the at least one of the unmodified segments includes a line segment.

4. The method as described in claim 1, wherein the at least one of the unmodified segments includes a curve segment.

5. The method as described in claim 1, wherein the at least one feature in common is a direction.

6. The method as described in claim 1, wherein the at least one feature in common is defined by a style transfer policy.

7. The method as described in claim 1, wherein mapping the at least one of the segments includes scaling the at least one of the segments.

8. The method as described in claim 1, wherein mapping the at least one of the segments includes shifting the at least one of the segments.

9. The method as described in claim 1, further comprising dividing the modified vector-based glyph and the additional vector-based glyph into a plurality of regions wherein the at least one feature in common is a region of the plurality of regions.

10. In a digital medium environment to identify a modification of a modified vector-based glyph and transfer the modification to an additional vector-based glyph, modules implemented at least partially in hardware of one or more computing devices of a system comprising:

a representation module implemented to:

convert an outline of the modified vector-based glyph into segments; and convert an outline of an unmodified vector-based glyph into unmodified segments;

a modification identification module implemented to:

compare the segments and the unmodified segments on a segment-by-segment basis; and identify the modification as at least one of the segments and a replaced portion as at least one of the unmodified segments;

a segment identification module implemented to:
   determine a direction of the at least one of the unmodified segments based on a difference between a start point and an endpoint of the at least one of the unmodified segments;
   determine a direction of each segment of an outline of the additional vector-based glyph; and
   identify at least one similar segment of the additional vector-based glyph by comparing the direction of the at least one of the unmodified segments to the direction of each segment of the outline of the additional vector-based glyph, the at least one similar segment and the at least one of the unmodified segments having at least one feature in common; and
a transferring module implemented to transfer the modification to the additional vector-based glyph by mapping the at least one of the segments to the at least one similar segment.

11. The system as described in claim 10, wherein the at least one similar segment and the at least one of the unmodified segments have at least two features in common.

12. The system as described in claim 10, wherein the at least one feature in common is the direction of the at least one of the unmodified segments.

13. The system as described in claim 10, further comprising a transfer policy module implemented to apply a style transfer policy that defines the at least one feature in common.

14. The system as described in claim 10, wherein the mapping includes scaling the at least one of the segments.

15. One or more computer-readable storage media comprising instructions stored thereon that, responsive to execution by a computing device, causes the computing device to perform operations including:
   converting an outline of a modified vector-based glyph into segments and converting an outline of an unmodified vector-based glyph into unmodified segments;
   comparing the segments and the unmodified segments on a segment-by-segment basis by:
     determining a direction of each of the segments based on a difference between a start point and an endpoint of each of the segments;
     determining a direction of each of the unmodified segments based on a difference between a start point and an endpoint of each of the unmodified segments; and
     comparing directions of the segments with directions of the unmodified segments;
   identifying a modification of the modified vector-based glyph as at least one of the segments and a replaced portion as at least one of the unmodified segments based on comparing the directions;
   identifying at least one similar segment of an additional vector-based glyph by comparing the at least one of the unmodified segments to segments of an outline of the additional vector-based glyph, the at least one similar segment and the at least one of the unmodified segments having a feature in common; and
   transferring the modification to the additional vector-based glyph by mapping the at least one of the segments to the at least one similar segment.

16. The one or more computer-readable storage media as described in claim 15, wherein the at least one of the unmodified segments includes a line segment and the at least one similar segment includes a line segment.

17. The one or more computer-readable storage media as described in claim 15, wherein the at least one of the unmodified segments includes a curve segment and the at least one similar segment includes a curve segment.

18. The one or more computer-readable storage media as described in claim 15, wherein the at least one of the unmodified segments includes a line segment and the at least one similar segment includes a curve segment.

19. The one or more computer-readable storage media as described in claim 15, wherein the at least one of the unmodified segments includes a curve segment and the at least one similar segment includes a line segment.

20. The one or more computer-readable storage media as described in claim 15, wherein the at least one of the unmodified segments includes a single unmodified segment and wherein the at least one of the segments includes multiple segments.

* * * * *